UNITED STATES PATENT OFFICE.

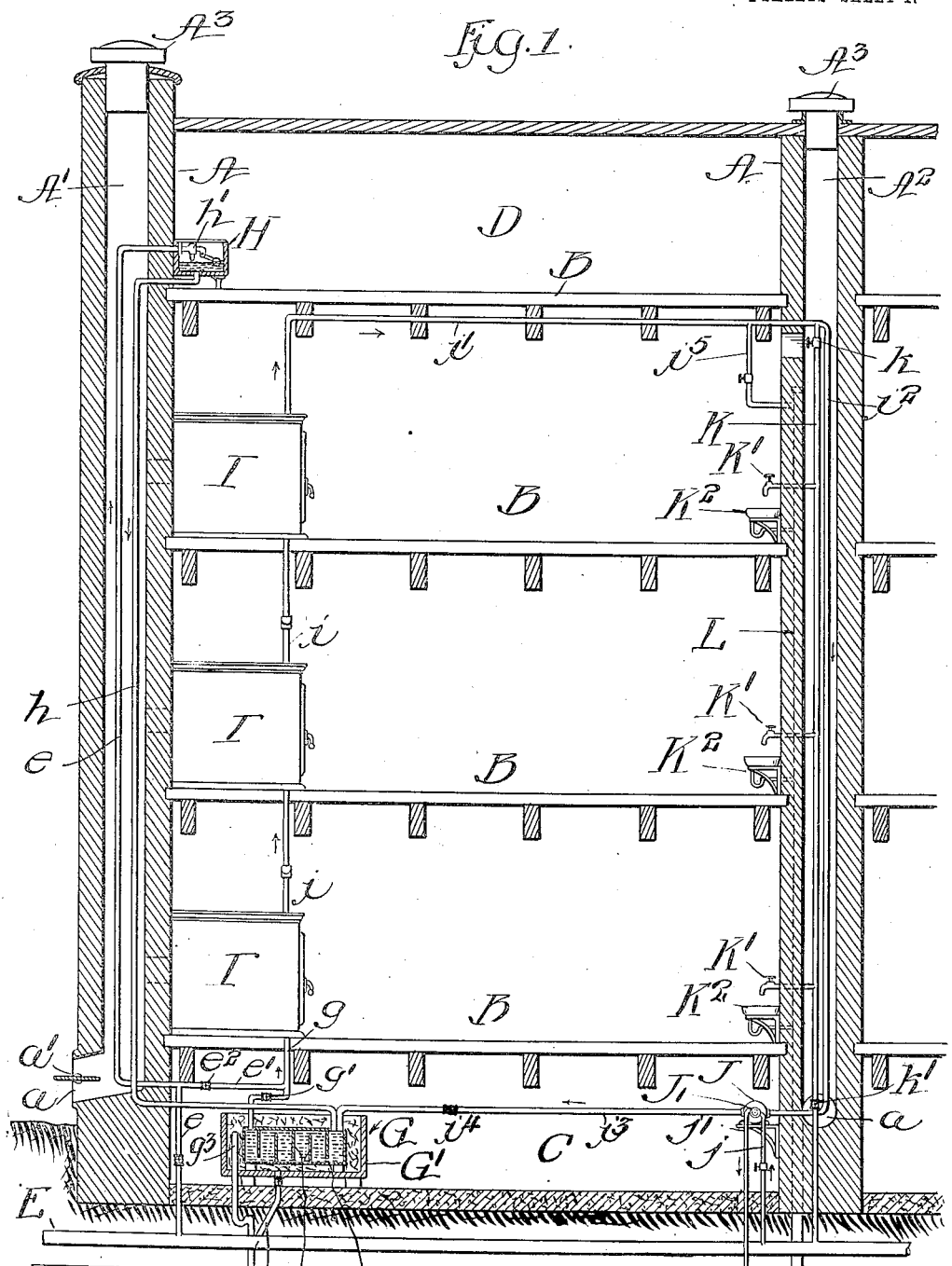

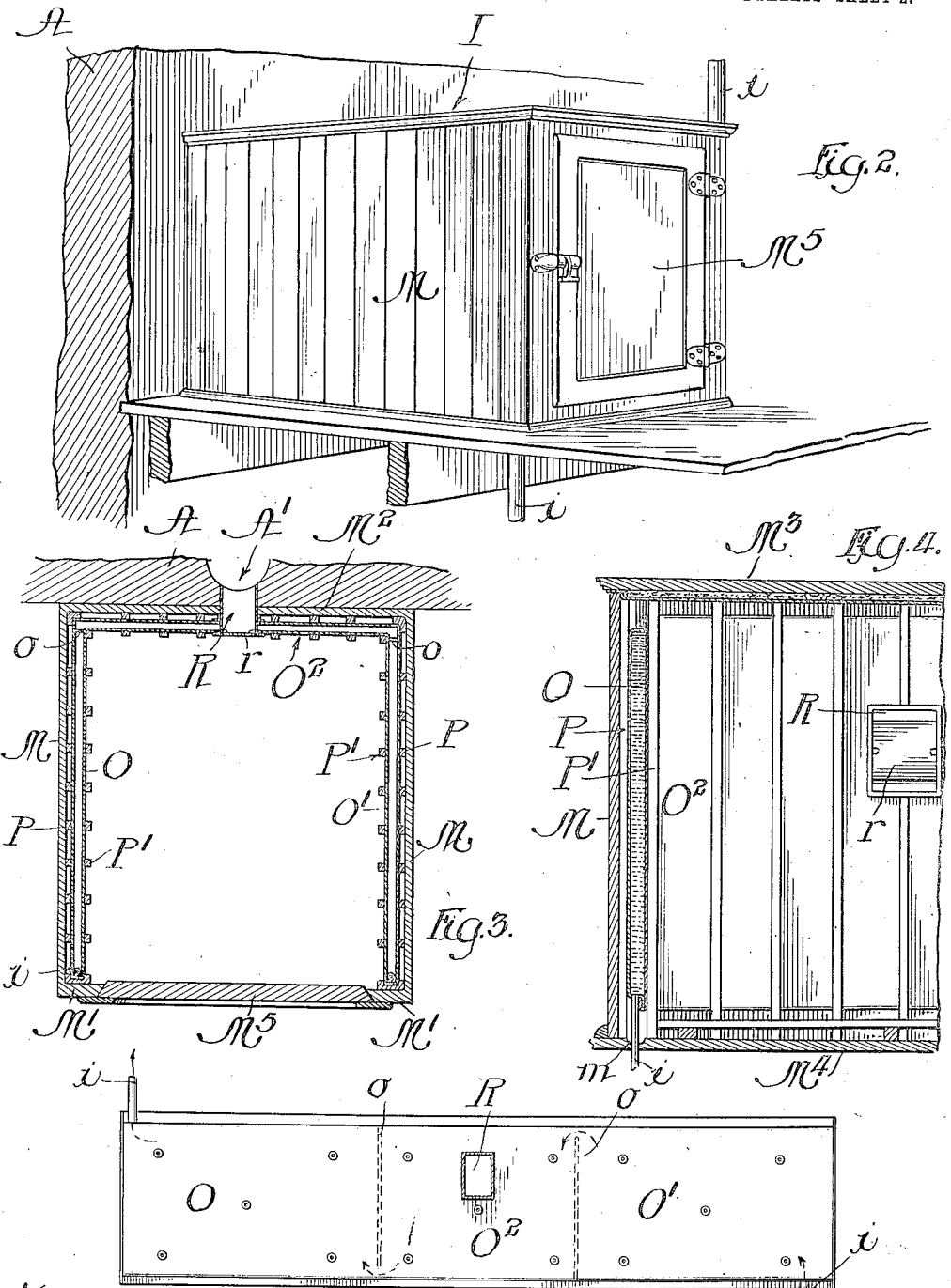

GEORGE FLEMING, OF CHICAGO, ILLINOIS.

SYSTEM OF REFRIGERATION AND WATER-SUPPLY.

No. 920,557.      Specification of Letters Patent.      Patented May 4, 1909.

Application filed September 21, 1907. Serial No. 393,894.

*To all whom it may concern:*

Be it known that I, GEORGE FLEMING, a citizen of the United States, and a resident of Chicago, in the county of Cook and State of Illinois, have invented certain new and useful Improvements in Systems of Refrigeration and Water-Supply; and I do hereby declare that the following is a full, clear, and exact description thereof, reference being had to the accompanying drawings, and to the letters of reference marked thereon, which form a part of this specification.

This invention relates to a novel system or apparatus for supplying and distributing water to the various rooms or apartments of a building from a pressure water supply and utilizing the water or a portion of it for refrigerating purposes, as, for instance, in refrigerators or other cooling devices located in various parts of the building.

The invention consists in the matters hereinafter more particularly set forth and pointed out in the appended claims.

In the accompanying drawings:—Figure 1 is a vertical section taken through the walls and floors of a building equipped with my water distributing and refrigerating system. Fig. 2 is a view in perspective of a refrigerating box or cooling device designed for use in connection with the system. Fig. 3 is a horizontal section through the walls of said box. Fig. 4 is a vertical section, on an enlarged scale, of the refrigerator or cooling device. Fig. 5 is a plan view of the side and end walls of said box developed upon a plane.

As shown in Fig. 1 of said drawings, A A designate two side walls of a building, either of which may be an outer wall, and B, B designate the floors of the building. C designates the basement of the building and D an upper compartment which may be the attic. The two walls A, A are each provided with vertical passages or flues $A^1$, $A^2$ in which are located parts of the apparatus to be hereinafter described. The flues are provided at their lower ends with air inlet openings $a$ and with valves $a^1$ for controlling the passage of air therethrough, one of which valves only being herein shown. The upper ends of said flues are equipped with ventilators $A^3$ of any approved type. E designates a water supply main and F a sewer main located in the ground below the basement floor.

G designates a water cooling device or ice-box located in the basement of the building, and H designates a water distributing tank located in the attic or above the highest level at which water is drawn from the system. From the water supply main E a pipe $e$ leads upwardly through the flue $A^1$ to the water distributing tank H. From said tank a pipe $h$ leads downwardly through said flue $A^1$ into one end of the ice-box G. From the opposite end of said ice-box a pipe $g$ leads upwardly to the lowermost one of a series of refrigerators I, I located on the several floors of the building. Said refrigerators are connected in series with each other and with the ice-box, whereby cool water from the ice-box is supplied to said refrigerators in a manner hereinafter to be described. To this end said refrigerators are connected by pipes $i$ arranged for the passage of water through each in turn. A pipe $i^1$ receives water discharged from the uppermost refrigerator of the series. Said pipe $i^1$ extends horizontally across the building near the upper floor and connects with the upper end of a pipe $i^2$ that leads downwardly through the flue $A^2$ and connects at its lower end with a horizontal pipe $i^3$ in the basement that enters the water space in the ice-box G at a point near the lower end of the pipe $h$. The water spaces of the ice-box G and the refrigerators and their connecting pipes and the pipes $i^1$, $i^2$, and $i^3$ constitute a closed circuit through which the water is circulated and the circulating water is maintained cooled by its passage through the ice-box.

In the operation of the system, water from the water supply main E enters the distributing tank H through the pipe $e$ and descends through the pipe $h$ to fill the circuit composed of said pipes $i$, $i^1$, $i^2$ and $i^3$ and the water spaces of the ice-box and refrigerators. The upper or discharge end of the pipe $e$ is provided within the distributing tank H with a float controlled valve $h^1$ which operates to maintain a predetermined level of water in said tank and to keep the system filled, the water being delivered to the closed circuit at the ice-box G. From thence the water rises in said circuit until the water has reached a predetermined level in said tank H, whereupon the float controlled valve $h^1$ operates to shut off the water supply.

The water is positively circulated through the system in the direction indicated by the arrows by means of a pump P located, as herein shown, in the pipe $i^3$ and driven by a water motor $J^1$ supplied with water from a pipe $j$ which communicates with the water main E. The spent water from the motor is discharged through a drain pipe $j^1$ into the sewer main F. Said pump J may however be driven by other means, as for example, by an electric motor.

K designates a branch pipe which communicates at its upper end with the circuit, composed of the pipes and water passages before referred to, at or near the highest point of said circuit and communicates at its lower end with the pressure supply main E. As herein shown said pipe K is located within the flue $A^2$ and communicates at its upper end with the horizontal pipe $i^1$. Said branch pipe is provided with two valves $k$ and $k^1$, the former located at its upper end and the latter near its lower end. The branch pipe K constitutes a serving pipe for serving water to the different floors of the building and, for this purpose, is provided with draw-off cocks $K^1$ $K^1$ located above and discharging into drain basins or sinks $K^2$ at the several floors. The said basins or sinks drain into a drain pipe L which discharges at its lower end into the sewer F. When water is being circulated through the cooling circuit, including the ice-box and refrigerator, the water serving pipe is closed to the circuit by the closing of the upper valve $k$ and is opened to the pressure main E by the opening of the lower valve $k^1$. The serving pipe K is therefore filled with water which may be withdrawn therefrom through the cocks $K^1$ as required.

It is also intended that the system may operate to circulate water through the refrigerators which has not been cooled by passing it through the ice-box G as, for example, during the cooler seasons when the water may be cool enough for refrigerating purposes without having been artificially cooled. For this purpose, a branch pipe $e^1$, provided with a valve $e^2$, leads from the pipe $e$ directly into the pipe $g$, and said pipe $g$ is provided with a valve $g^1$. Therefore by opening said valve $e^2$ and closing the valve $g^1$, water enters the pipe $g$ without having passed through the ice-box or through the distributing or controlling tank H. When this occurs the serving pipe K constitutes part of the circuit for the cooling water. Such communication is brought about by opening the upper valve $k$ thereof and closing the lower valve $k^1$. Such adjustment cuts the pipes $i^2$ and $i^3$ out of the circuit, and in order to prevent the system from flooding through the tank H a valve $i^4$ is located between said tank and the junction of the pipes $i^1$ and K. As herein shown said valve $i^4$ is located in the pipe $i^3$. There is also provided a valved pipe $i^5$ leading from the pipe $i^1$ directly into the drain pipe L. By opening the valve in said pipe $i^5$ a larger quantity of water is allowed to escape from the system and be replaced by fresh water from the water main E, than would be the case if the water were allowed to escape only from the draw-off cocks. In this manner the cooling effect in the refrigerators is increased.

The ice-box G consists of an outer casing $G^1$ adapted to receive ice and an inner closed chamber or tank $G^2$ arranged for the passage therethrough of the water which is intended to be cooled by said device. Said inner chamber $G^2$ is divided by vertical partitions $g^2$ into a number of compartments and the partitions are so arranged that the water passes in a zig-zag course from end to end thereof, thus increasing the cooling effect of the ice on the water. A drain pipe $g^3$ connecting with the sewer F opens into the ice compartment at a point above the bottom thereof to drain water from the melting ice to the level of the upper end of said pipe. A second valved drain pipe $g^4$ serves to drain all of the water from the ice compartment when desired.

The construction of the refrigerators is shown in Figs. 2 to 5, inclusive. Each refrigerator comprises side walls M, M, front and back walls $M^1$, $M^2$ and top and bottom walls $M^3$, $M^4$. The front wall is provided with a door $M^5$ by means of which access may be had to the interior. Inclosed by the side and rear walls is a flat tank or jacket comprising three portions O, $O^1$, $O^2$, the two former being arranged against the side walls and the latter against the rear wall. Said tanks or jackets are laterally narrow and communicate with each other at the corners of the refrigerator box. The connecting pipes $i$ each enter one side section of the tank or jacket at the bottom and forward end thereof and leave the other side section at the top and forward end, thus insuring that the water shall pass entirely through the cooling jacket or tank. The three sections of the water tank or jacket are separated by vertical baffle plates $o$, $o$ one of which is arranged to leave a space between its upper margin and the top wall of the tank and the other to leave a similar space at its lower margin, whereby water entering at the bottom of one side section passes therethrough, thence downwardly through the next adjacent or end section and finally upwardly through the second side section into one of the pipes $i$, through which it passes to the next superadjacent refrigerator. Said water tanks or jackets are spaced from the side and rear walls of the box by means of vertically arranged battens P, thus permitting circulation of air between said jackets and the box walls. Other battens $P^1$ are arranged upon the inner walls of the jackets to prevent articles placed in the box from indenting said inner jacket walls. Below the walls of the jacket in the bottom wall of the refrigerator box I is arranged a small channel or trough m by means of which water condensing upon the walls of the refrigerator or the jacket may be collected and drained off.

Through the rear wall M² of the refrigerator box, the rear jacket section and through the adjacent wall of the building A, a flue or passage R opens into the flue A¹ whereby fresh air may be supplied to the box from said flue. Said passage is provided with a controlling damper or shutter r. This air may be admitted to the refrigerator chambers during cold weather and afford material aid to the water circulating in the jackets around the refrigerator spaces to cool the refrigerator spaces.

I claim as my invention:—

1. In a system of refrigeration and water supply, the combination with a source supplying water under pressure and a circuit receiving water from said source of supply including a refrigerator and a cooling device through which the water passes, of a serving pipe provided with a plurality of draw-off cocks, said serving pipe being connected with said circuit and directly with said source of supply, and means whereby water may be directed to the serving pipe either from the circuit or from the source of supply at will.

2. In a system of refrigeration and water supply, the combination with a source supplying water under pressure and a circuit receiving water from said source of supply including a refrigerator and a cooling device through which the water passes, of a serving pipe provided with a plurality of draw-off cocks, said serving pipe being connected with said circuit and directly with said source of supply, means whereby water may be directed to the serving pipe either from the circuit or from the source of supply at will, and means for cutting said cooling device out of the operating circuit when the serving pipe receives water from said circuit.

3. In a system of refrigeration and water supply, the combination with a source supplying water under pressure and a circuit receiving water from said source of supply, of a refrigerator located in said circuit and having a cooling space or jacket through which the water in the circuit passes to cool the same, a water serving pipe connected with said circuit near the highest part thereof and provided with a plurality of draw-off cocks and communicating at its lower end with said source of supply, and valves in said serving pipe so located and arranged as to supply water to the draw-off cocks through said serving pipe from said circuit or from the source of supply at will.

4. In a system of refrigeration and water supply, the combination with a source supplying water under pressure and a water conducting circuit including a refrigerator having a cooling space or jacket through which the water passes and a cooling device through which the water in the circuit is passed to cool the same, means for automatically maintaining a constant level of water in said circuit independently of the pressure of the source of supply, a serving pipe provided with a plurality of draw-off cocks, said serving pipe being connected with said circuit and directly with said source of supply, means whereby water may be directed to the serving pipe either from the circuit or from the source of supply at will, and means for cutting said cooling device out of the operating circuit when the serving pipe receives water from said circuit.

5. In a system of refrigeration and water supply, the combination with a source supplying water under pressure and a circuit receiving water from said source of supply, of a refrigerator located in said circuit and having a cooling space or jacket through which the water in the circuit passes to cool the same, a water serving pipe connected with said circuit near the highest part thereof and provided with a plurality of draw-off cocks and communicating at its lower end with said source of supply, valves in said serving pipe so located and arranged as to supply water to the draw-off cocks through said serving pipe from said circuit or from the source of supply at will, and a valved drain pipe connected with said circuit for withdrawing water therefrom independently of said draw-off cocks.

In testimony, that I claim the foregoing as my invention I affix my signature in the presence of two witnesses, this 12th day of September A. D. 1907.

GEORGE FLEMING.

Witnesses:
A. M. Bunn,
T. H. Alfreds.